June 11, 1940.  C. J. DALLEY  2,204,071
PINKING SHEARS
Filed Jan. 27, 1939
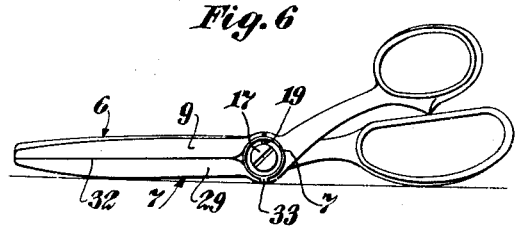
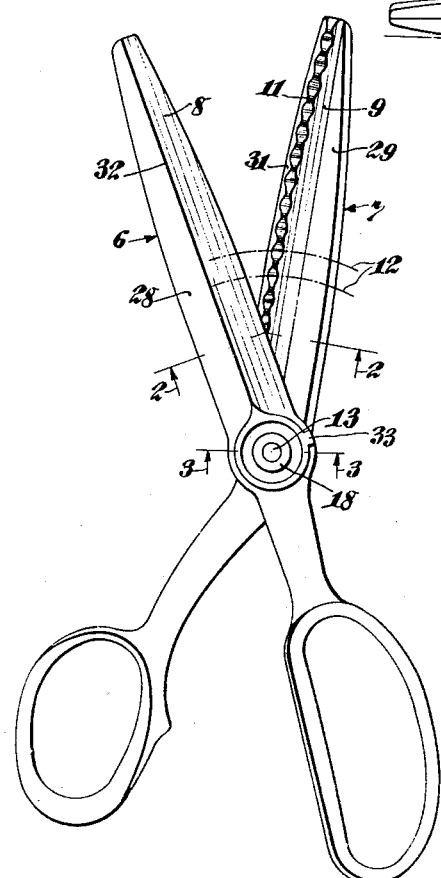
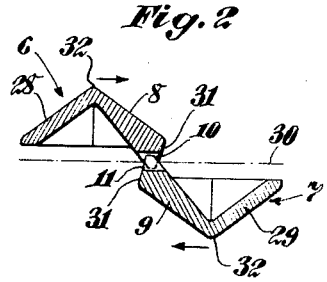
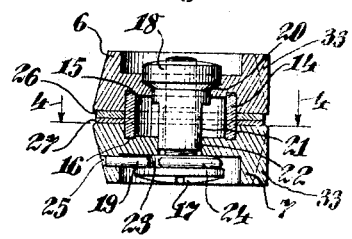
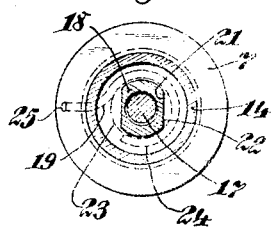
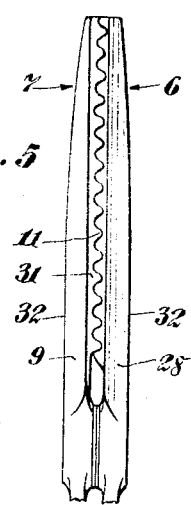
INVENTOR.
Charles J. Dalley,
BY
ATTORNEY.

Patented June 11, 1940

2,204,071

UNITED STATES PATENT OFFICE 2,204,071

PINKING SHEARS

Charles J. Dalley, Maplewood, N. J.

Application January 27, 1939, Serial No. 253,074

3 Claims. (Cl. 30—230)

The invention disclosed herein relates to pinking shears of the type disclosed in the expired patent to Austin 489,406, of Jan. 3, 1893.

The objects of the invention are to improve constructions of the type referred to, particularly as to combining the features of light weight and economical use of high grade steel with desirable blade stiffness and strength, simplicity of construction, long lasting cutting edges and self-centering blade pivot; and further a construction which can be readily manufactured at low cost and by simple manufacturing methods.

Other objects and the various novel features of the invention by which all objects are attained will appear and are set forth in the following specification.

The drawing accompanying and forming part of the specification illustrates one practical commercial embodiment of the invention. The exact design and construction however may be modified and changed in various ways, within the true scope of the invention, as will appear from the broad intent of the claims hereafter.

Fig. 1 is a face view of the shears.

Fig. 2 is an enlarged cross-sectional detail as on substantially the line 2—2 of Fig. 1.

Fig. 3 is an enlarged cross-sectional detail as on line 3—3 of Fig. 1.

Fig. 4 is a sectional view as on line 4—4 of Fig. 3.

Fig. 5 is an edge view of the shears.

Fig. 6 is a side view illustrating the self-supporting feature of the shears.

In the present invention, the blades of the shears, designated 6 and 7, have a substantially V-shaped cross-section as shown in Fig. 2, and are pivotally connected with the hollow faces in opposed relation. This construction combines the features of lightness and stiffness and provides the similarly inclined and generally parallel walls 8, 9, for carrying the cooperating pinking teeth 10, 11. These teeth are shown as produced by cutting, grinding or otherwise grooving the edges of the generally parallel inclined walls 8, 9, such grooves being offset to accomplish the necessary mating relation of the teeth. These grooves and the teeth which they form are cut on arcs 12, concentric to the pivotal axis 13, of the blades.

Special provision preferably is made for maintaining the true concentric relation of the pinking teeth. In the illustration, the blades pivot on an accurately formed annular pivot bushing 14, Figs. 3 and 4, the opposing faces of the blades having annular seats 15, 16, rotatably fitting the ends of this pivot bushing and the parts being adjustably retained in this relation by screw 17, nut 18 and lock spring 19. The nut is shown as having a rotatable bearing in blade 6 at 20, and as having a flattened portion 21, fitting in a correspondingly shaped opening 22, in blade 7. Screw 17, located at blade 7, extends into the thus held end of the nut and is in turn held against rotation in blade 7, by having a concavely grooved shouldered portion 23, beneath the head of the same engaged within the loop 24, of the lock spring, the latter having a straight end portion entered in an anchoring recess 25, in the surrounding wall of the blade. The lock spring is thus secured against rotation in the blade and by its grip on the screw holds the latter against accidental displacement. The blades are further guided and supported in their pivotal relation in the illustration by companion antifriction washers 26, 27, as of bronze and steel respectively surrounding the pivot bushing 14, and disposed between the opposed abutment faces of the blades.

The blades are readily forged or otherwise produced with the hollow substantially V-shape cross-section, and with either the handle portions integral or to be later attached. The angular relation of the convergent side walls forming the V-shape cross-section provides the effect of a truss construction, giving the blades longitudinal stiffness with comparatively light weight and economical use of blade steel.

In forming the blades, the inside walls 8, 9, which cross in the closing movement of the shears may be extended or made just sufficiently wider than the other or outside walls 28, 29, to have the pinking teeth cut therein. The toothed walls 8, 9, being inclined toward the cutting plane 30, Fig. 2, approach at a shearing angle favorable for pinking purposes. The opposed meeting faces of the teeth may be bevelled inwardly toward the line of cut, as indicated at 31, to support and facilitate smooth approach of the material to the cutting position.

The structure is particularly simple and sturdy and free of any flanges or thin parts which might spring or yield in use of the tool. The special pivot construction accurately guides and supports the blades so that they will continue true in operation. As the teeth are formed concentrically in relation to the pivotal center, production costs are low.

The ridges 32, at the outside of the blades, at the joinder of the relatively inclined walls 8, 28 and 9, 29, are located substantially mid-width of the blades and in line with the pivotal center as shown in Fig. 1. As shown in the edge view Fig. 5, these ridges may curve or incline toward each other in conformity with the depth of the V-shaped troughs at the inside of the blades and which grow shallower from the pivot point toward the free ends of the blades. With a structure of this truss formation, the oppositely inclined walls of the blades may be relatively thin, so that a minimum amount of high grade steel is required, without any sacrifice of stiffness or strength. The formation of the pinking teeth in walls which are inclined toward the cutting plane enables such teeth to be formed deeper or longer than is practical in constructions where the teeth are formed in narrow flanges projecting from the inside faces of opposing flat blades.

The shape of the teeth cut in the edge of the lower inclined wall 8 of the upper blade 6 and in the edge of the upper inclined wall 9, of lower blade 7, may vary considerably, since the extent of these inclined walls provides depth for many various configurations of teeth. The hub portions of the blades are shown as having dependent webs or flanges 33, projecting far enough and registering in the closed position of the blades to form a rest adapted to support the shears in an upright position on the bench or worktable. This enables the shears to be put down in an upright position, ready to be picked up in position for instant use.

What is claimed is:

1. Pinking shears, comprising companion blades of substantially V-shaped cross-section, each blade consisting of convergently inclined connected walls forming a longitudinal V-shaped trough at one side and a longitudinal V-shaped ridge at the opposite side of the blade, said blades being disposed with the trough faces of the same in opposition, means pivotally connecting said blades in such relation with one inclined wall of each V-shaped blade inclined inwardly in the direction of cutting movement toward a common intermediate shearing plane between the blades and said inwardly inclined walls having complementary pinking teeth on the edges of the same extending beyond said common intermediate plane in overlapping relation and in arcuate form, substantially concentric to the axis of pivotal movement.

2. The combination of claim 1, in which the peaks of said V-shaped ridges at the outer sides of the blades are substantially mid-width of the blades and extend substantially radially from said axis of pivotal movement.

3. The combination of claim 1, in which said pinking teeth are carried by bevelled extensions at the edges of said inwardly inclined walls of the companion blades.

CHARLES J. DALLEY.